(12) United States Patent
Chandan et al.

(10) Patent No.: US 6,827,507 B2
(45) Date of Patent: Dec. 7, 2004

(54) SYSTEMS AND METHODS FOR REDUCING SPLICE LOSS IN OPTICAL FIBERS

(75) Inventors: Harish C. Chandan, Snellville, GA (US); Masakazu Nakano, Shizuoka-Pref. (JP)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/317,521

(22) Filed: Dec. 12, 2002

(65) Prior Publication Data

US 2004/0114887 A1 Jun. 17, 2004

(51) Int. Cl.[7] .............................................. G02B 6/255
(52) U.S. Cl. ............................ 385/95; 385/96; 385/99
(58) Field of Search ............................. 385/28, 95, 96, 385/97, 98, 99

(56) References Cited

U.S. PATENT DOCUMENTS 5,894,536 A * 4/1999 Rifkin et al. ................. 385/99
6,543,942 B1 * 4/2003 Veng ............................. 385/95
6,666,591 B2 * 12/2003 Sasaoka et al. ............... 385/95
2003/0026539 A1 * 2/2003 Kato ............................ 385/34

* cited by examiner

Primary Examiner—Chau N. Nguyen
(74) Attorney, Agent, or Firm—Daniel Kim, Esq.

(57) ABSTRACT

Techniques are described for reducing splice loss by using an ultra-short bridge fiber to splice together a first fiber and a second fiber having different modefield diameters. The ultra-short bridge fiber has an intermediate modefield diameter between the modefield diameters of the first and second fibers. In one described technique, a first end of the ultra-short bridge fiber is spliced to a lead end of the first fiber at a first splice point. The bridge fiber is then cleaved at a predetermined distance away from the first splice point. A lead end of the second fiber is then spliced to cleaved end of the bridge fiber at a second splice point. A single protective splint is then installed that covers the bridge fiber and the first and second splice points. Further described is an optical fiber transmission line including an ultra-short bridge fiber.

10 Claims, 10 Drawing Sheets

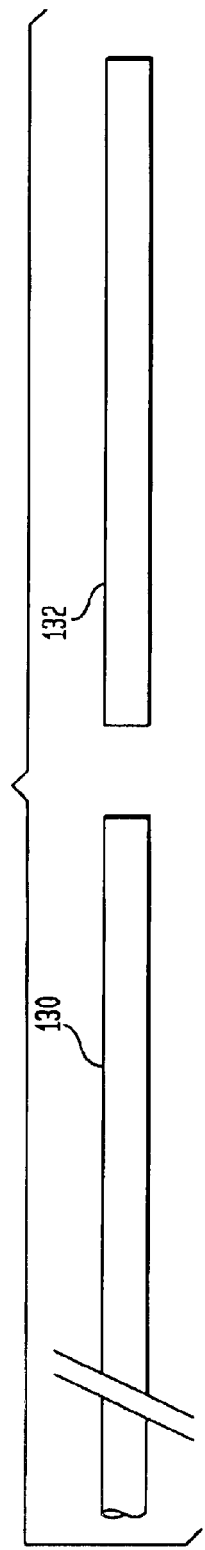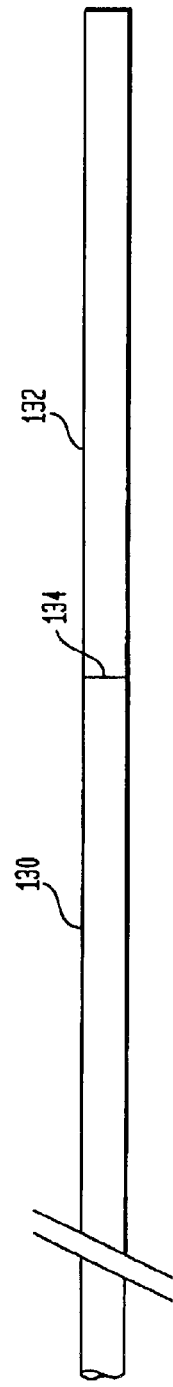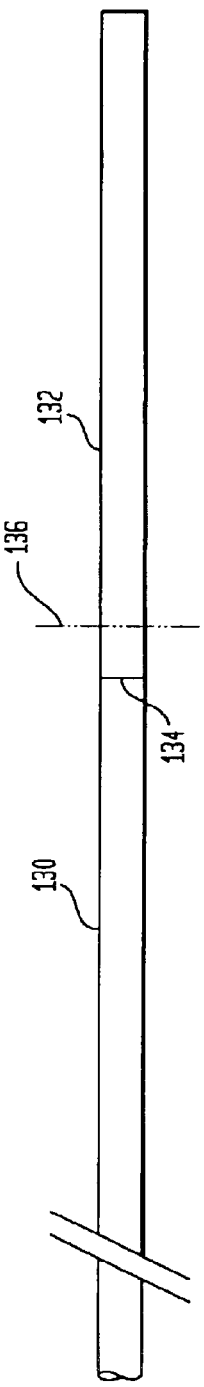

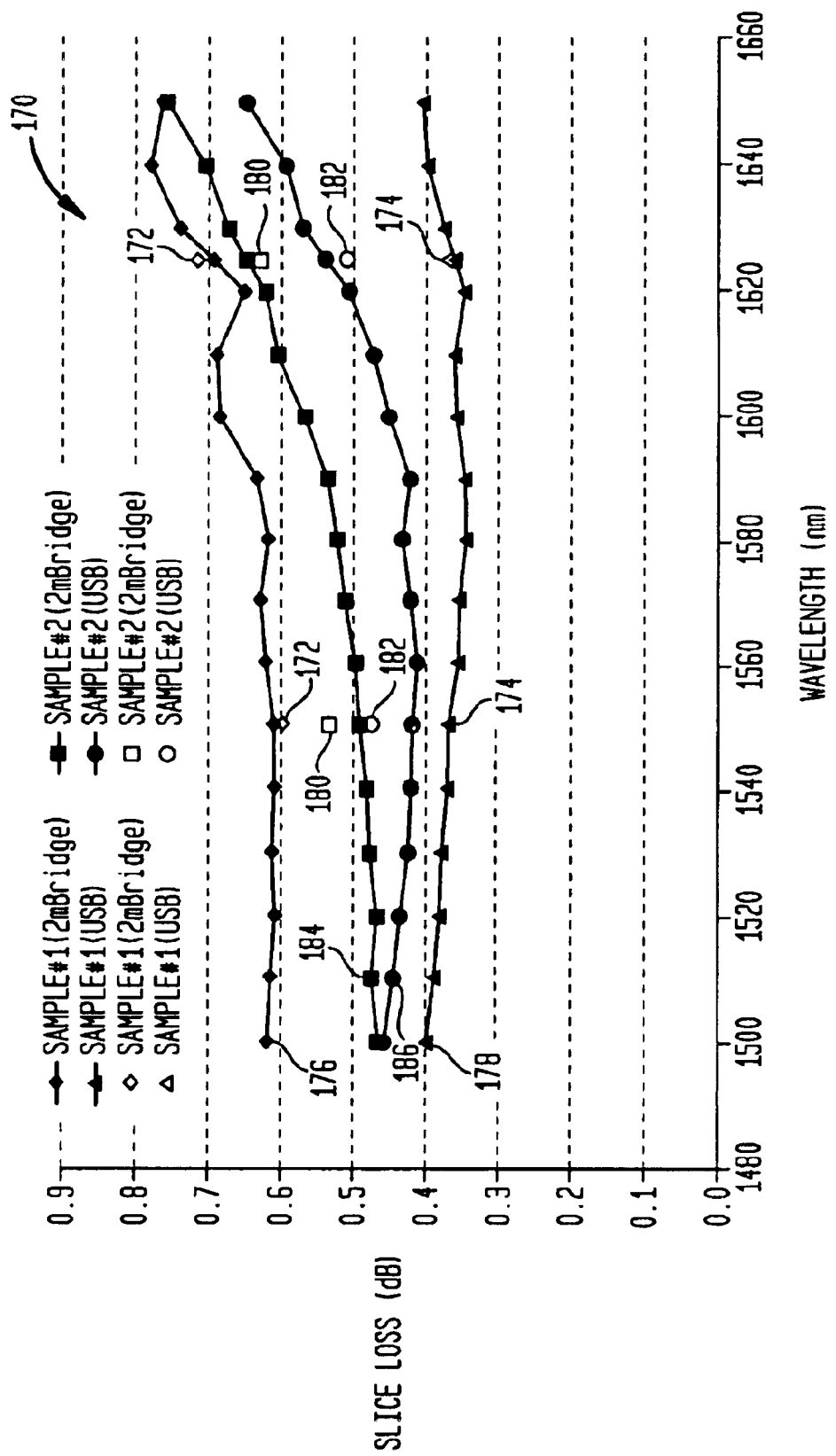

FIG. 17

ULTRA-SHORT-BRIDGE SPLICE — 200

| SPLICER | MODEL | USE | FIBER TYPE | BEST LOSS AT 1550nm | COMMENT |
|---|---|---|---|---|---|
| ALCOA-FUJIKURA | FSM-40S | FIELD | DP-DV | 0.371 dB | |
| ERICSSON | FSU995FA | FACTORY | DP-DV | 0.361 dB | |
| ERICSSON | FSU995FA | FACTORY | DP-DW | 0.413 dB | USING FITEL MFD EXPANDER |
| ERICSSON | FSU995FA | FACTORY | DP-DW | 0.314 dB | |
| ERICSSON | FSU995FA | FACTORY | DP-DW | 0.38dB(0.13dB+0.25dB) | CURRENT BRIDGE SPLICE (R&D) |
| ERICSSON | FSU995FA | FACTORY | DP-DV | 0.67dB(0.40dB+0.27dB) | BRIDGE SPLICE (PRODUCTION 2001) |

DP-DV OR DP-DW DIRECT SPLICE — 220

| SPLICER | MODEL | USE | FIBER TYPE | BEST LOSS AT 1550nm | COMMENT |
|---|---|---|---|---|---|
| ALCOA-FUJIKURA | FSM-40F | FIELD/FACTORY | DP-DW | 0.521dB | |
| ERICSSON | FSU995FA | FACTORY | DP-DV | 1.05dB | |
| ERICSSON | FSU995FA | FACTORY | DP-DW | 0.863dB | USING FITEL MFD EXPANDER |
| ERICSSON | FSU995FA | FACTORY | DP-DW | 0.854dB | |
| ERICSSON | FSU995FA | FACTORY | DP-DW | 0.10dB / 0.26dB | TEC |
| ERICSSON | FSU995FA | FACTORY | DP-DW | 0.083dB / 0.13dB | VYTRAN PRETREATMENT |

SYSTEMS AND METHODS FOR REDUCING SPLICE LOSS IN OPTICAL FIBERS

BACKGROUND OF THE INVENTION

1. Field of the Invention

The present invention relates generally to improvements in the field of fiber optics, and particularly to advantageous aspects of systems and methods for reducing splice loss in optical fibers.

2. Description of Prior Art

An optical fiber transmission line typically includes more than one type of fiber. For example, in order to achieve a desired overall dispersion characteristic, an inverse dispersion fiber (IDF), which has a steeply negative dispersion slope, may be spliced to another type of fiber having a positive dispersion slope. However, IDF typically has a relatively narrow modefield diameter, whereas other types of fiber, such as a super large area (SLA) fiber, have a modefield diameter that is significantly larger than the IDF modefield diameter. This mismatch in modefield diameter may result in an unacceptably large amount of splice loss if the two fibers are spliced directly to each other.

One technique that has been developed to reduce splice loss between first and second fibers having different modefield diameters is the use of a bridge fiber having an intermediate modefield diameter. Instead of splicing the first fiber directly to the second fiber, the first fiber is spliced to a first end of the bridge fiber, and the second fiber is spliced to a second end of the bridge fiber. Depending upon the respective properties of the first fiber, second fiber, and bridge fiber, it is possible for the total splice loss using a bridge fiber to be significantly less than the splice loss that results when the first fiber is spliced directly to the second fiber. A bridge fiber technique is described, for example, in Edvold, B. and Gruner-Nielsen, L., "New Technique for Reducing the Splice Loss to Dispersion Compensating Fiber," European Conference on Optical Communication, 1996.

However, certain issues have arisen in connection with currently used bridge fibers and bridge fiber techniques. For example, under current practice, a typical length for a bridge fiber is 2 meters, or greater. Because a typical optical cable may include dozens of individual fibers, each to be spliced to a separate bridge fiber, the use of a 2-meter bridge fiber causes problems in packing the bridge fibers into a standard splice case, particularly in the field. In addition, although currently used bridge fibers and bridge fiber techniques can significantly reduce splice loss, there is an ongoing search for ways to reduce splice loss even further.

SUMMARY OF INVENTION

Aspects of the invention provide techniques for reducing splice loss by using an ultra-short bridge fiber to splice together a first fiber and a second fiber having different modefield diameters. The ultra-short bridge fiber has an intermediate modefield diameter between the modefield diameters of the first and second fibers. In a method according to an aspect of the invention, a first end of the ultra-short bridge fiber is spliced to a lead end of the first fiber at a first splice point. The bridge fiber is then cleaved at a predetermined distance away from the first splice point. A lead end of the second fiber is then spliced to the cleaved end of the bridge fiber at a second splice point. A single protective splint is then installed that covers the bridge fiber and the first and second splice points.

Additional features and advantages of the present invention will become apparent by reference to the following detailed description and accompanying drawings.

BRIEF DESCRIPTION OF DRAWINGS

FIGS. 7–14 are a series of diagrams illustrating a technique according to an aspect of the invention for constructing an optical fiber transmission line having an ultra-short bridge fiber.

FIG. 16 shows a graph comparing splice loss resulting from using a 2-meter bridge fiber, and splice loss resulting from using an ultra-short bridge fiber.

FIG. 17 shows a table comparing splice loss resulting from using an ultra-short bridge fiber, and splice loss resulting from splicing a super large area (SLA) fiber directly to an inverse dispersion fiber (IDFx2).

DETAILED DESCRIPTION

The present invention provides an improved technique for reducing splice loss between two fibers having different modefield diameters. According to an aspect of the invention, splice loss is reduced by using an ultra-short bridge fiber to connect the two fibers. As used herein, the term "ultra-short bridge fiber" refers generally to a bridge fiber that is sufficiently short such that, for purposes of packaging the spliced fibers, the splice between the first fiber and the bridge fiber and the splice between the bridge fiber and the second fiber can be treated as a single splice.

Figure 1:
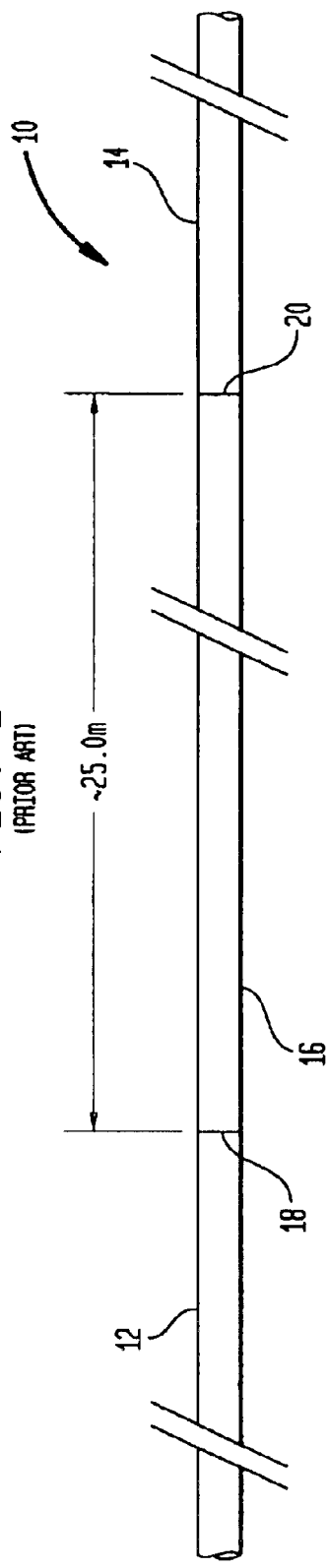
FIG. 1 shows a diagram of an optical fiber transmission line according to the prior art.

In order to provide a context for an understanding of the present invention, there is first provided a brief discussion of the prior art. FIG. 1 shows a diagram of an exemplary optical transmission line 10 according to the prior art, not drawn to scale. The transmission line 10 includes a first fiber 12, a second fiber 14, and a bridge fiber 16. A first end of the bridge fiber 16 is spliced to a lead end of the first fiber 12 at a first splice point 18. A second end of the bridge fiber 16 is spliced to a lead end of the second fiber 14 at a second splice point 20. The bridge fiber 16 typically has a length of 2 meters or greater.

In one current application, for example, the first fiber 12 is OFS Fitel Super Large Area Fiber (SLA), the second fiber is OFS Fitel Inverse Dispersion Fiber (IDF), and the bridge fiber 16 is OFS Fitel True Wave Fiber. This splice combination is used in a submarine environment. Because of the demands of this particular environment, the length of the bridge fiber 16 is approximately 25.0 meters. Once the two splices 18 and 20 have been executed, the respective splice regions are then re-coated to insure that the splices 18 and 20 are sufficiently strong and protected against the hostile operating environment. Because of the need to create high-strength splices, including re-coating the spliced fibers, these splices must typically be performed at the factory.

Figure 2:
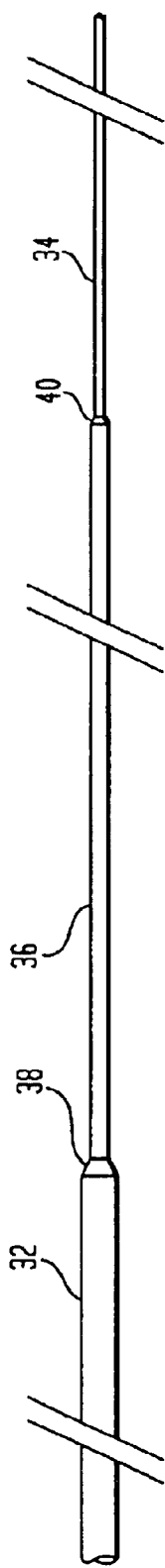
FIG. 2 shows a diagram illustrating the respective modefields of the fibers in the optical fiber transmission line shown in FIG. 1.

FIG. 2 shows a diagram illustrating the respective modefields of the first fiber 12, second fiber 14, and bridge fiber 16. As shown in FIG. 2, the first fiber modefield 32 has a relatively large diameter, the second fiber modefield 34 has a relatively narrow diameter, and the bridge fiber modefield 36 has an intermediate diameter, smaller than the diameter of the first fiber modefield 32 and larger than the diameter of the second fiber modefield 34.

As further illustrated in FIG. 2, there is a first transition region 38 between the first fiber modefield 32 and the bridge fiber modefield 36, and a second transition region 40 between the bridge fiber modefield 36 and the second fiber modefield 34. There is associated with each of the two transition regions 38 and 40 a certain amount of splice loss. However, the sum of the splice losses of the two transition regions 38 and 40 is lower than the splice loss that would result if the first fiber 12 were to be spliced directly to the second fiber 14, without the use of a bridge fiber 16.

As mentioned above, a bridge fiber is commonly installed at the factory. However, it would be desirable to be able to install a bridge fiber in the field. Techniques have been developed for performing and packaging direct splices between a pair of optical fibers outside of the factory. However, it is not practical to use these techniques in typical current splice combinations in which a bridge fiber is used.

Figure 3:
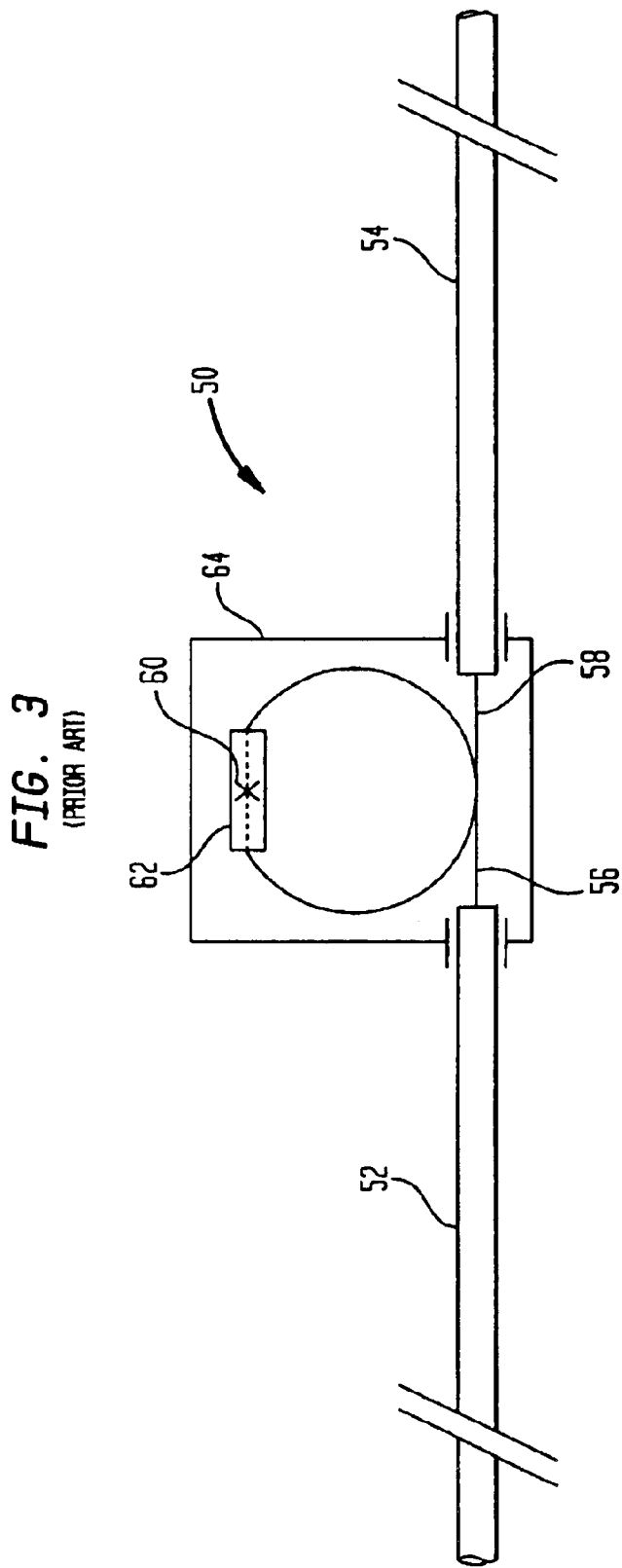
FIG. 3 shows a diagram illustrating a technique according to the prior art for packaging a direct splice between two fibers.

FIG. 3 shows a diagram illustrating an optical transmission line 50 embodying a technique according to the prior art for packaging a direct splice between a pair of optical fibers. The optical transmission line 50 includes a first optical cable 52 and a second optical cable 54. Each of the optical cables 52 and 54 includes a plurality of individual optical fibers. For purposes of illustration, single fibers 56 and 58 are shown extending, respectively, from first and second cables 52 and 54. The first and second fibers 56 and 58 are spliced together at a splice point 60, marked by an X, and the splice point 60 is covered by a protective splint 62. After the splint 62 has been installed, the exposed fiber 56 and 58, including the splice point 60 and protective splint 62 are coiled and packed inside a splice case 64, taking care to avoid any sharp bends or other stresses on the fibers 56 and 58.

It is not practical to use the arrangement shown in FIG. 3 for a splice combination including a bridge fiber according to the prior art, such as the splice combination illustrated in FIG. 1. As discussed above, a bridge fiber according to the prior art typically requires two splices, one at each end of the bridge fiber. The arrangement shown in FIG. 3 would require two protective splints 62: a first splint to protect the splice between the first fiber 56 and the bridge fiber and a second splint to protect the splice between the bridge fiber and the second fiber 58. However, an optical cable may contain dozens of individual fibers. Currently available splice cases are not large enough to accommodate double the number of protective splints 62.

Figure 4:
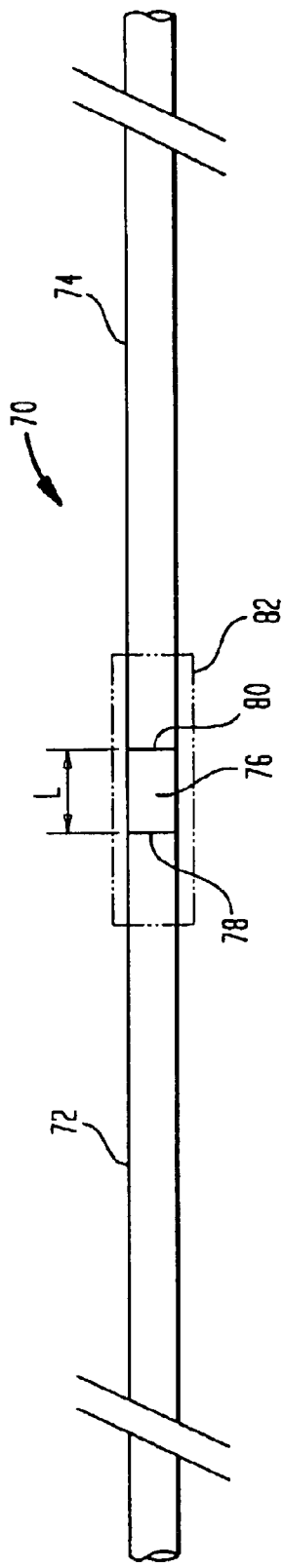
FIG. 4 shows a diagram of an optical fiber transmission line according to an aspect of the present invention.

FIG. 4 shows a diagram of an optical fiber transmission line 70 according to an aspect of the invention. The transmission line includes a first fiber 72 and a second fiber 74, connected to each other by an ultra-short bridge fiber (USBF) 76, having a length of approximately 1 millimeter. A lead end of the first fiber 72 is spliced to a first end of the USBF 76 at a first splice point 78, and a lead end of the second fiber 76 is spliced to a second end of the USBF 76 at a second splice point 80. Because the first and second splice points 78 and 80 are only 1 mm apart, a single splint 82 is used to cover both splice points 78 and 80.

Figure 5:
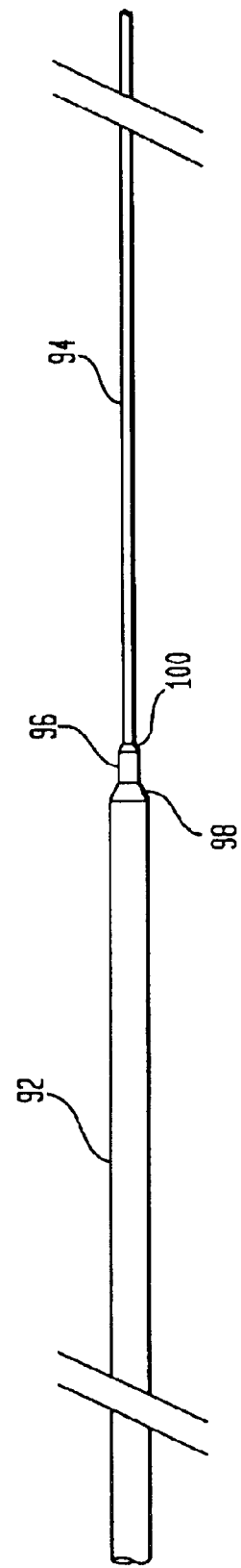
FIG. 5 shows a diagram illustrating the respective modefields of the optical fibers in the transmission line shown in FIG. 4.

FIG. 5 is a diagram of the respective modefields of the first fiber 72, second fiber 74, and USBF 76. As shown in FIG. 5, the first fiber modefield 92 has a relatively large diameter, the second fiber modefield 94 has a relatively narrow diameter, and the USBF modefield 96 has an intermediate diameter that is smaller than the diameter of the first fiber modefield 92 and larger than the diameter of the second fiber modefield 94.

As further shown in FIG. 5, there is a first transition region 98 between the first fiber modefield 92 and the USBF modefield 96, and a second transition region 100 between the USBF modefield 96 and the second fiber modefield 94. Each transition region 98 and 100 has associated therewith a certain amount of splice loss. However, the sum of the splice losses from the two regions 98 and 100 is lower than the splice loss that would result if the first fiber 92 were to be spliced directly to the second fiber 94, with the USBF 96. As set forth below, it has been observed using a USBF 96 typically results in a greater reduction in splice loss than the reduction in splice loss achieved using a prior-art bridge fiber, such as the bridge fiber 16 shown in FIG. 1.

Figure 6:
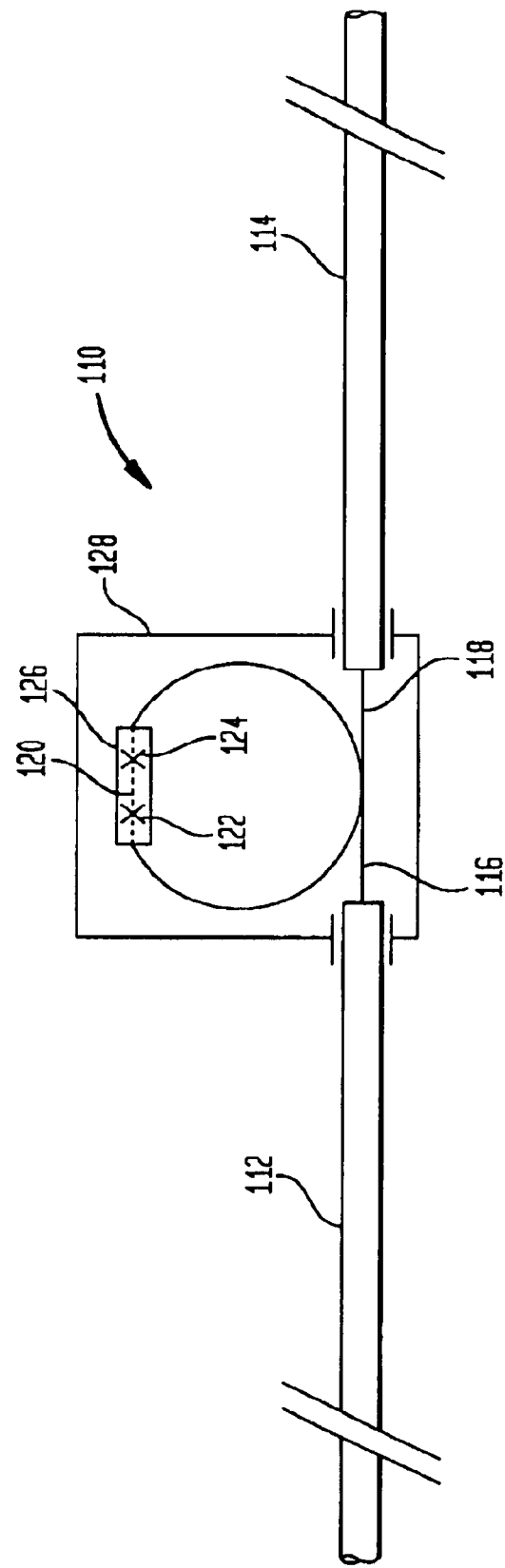
FIG. 6 shows a diagram illustrating a technique according to the present invention for packaging a splice combination including an ultrashort bridge fiber.

FIG. 6 shows a diagram of another optical fiber transmission line 110 according to a further aspect of the invention. The transmission line 110 includes a first optical cable 112 and a second optical cable 114. Each cable includes a plurality of individual fibers. For purposes of illustration, single fibers 116 and 118 are shown extending, respectively, from first cable 112 and second cable 114.

First and second fibers 116 and 118 are connected by a USBF 120 that is spliced therebetween at first and second splice points 122 and 124, marked by a pair of X's. The first and second splice points 122 and 124 are covered by a single protective splint 126. The first and second fibers 116 and 118, the USBF 120, the first and second splice points 122 and 124, and the protective splint 126 are packed inside of a splice case 128.

As shown in FIG. 6, the use of the USBF 120 and a single protective splint 126 creates a bridge fiber assembly that is approximately the same size as a direct splice between two fibers. Thus, using a USBF 120 allows a relatively large number of bridge splices to be comfortably packed into a standard splice case 126, thus making it easier for bridge fibers to be installed in the field, using currently available field splicing equipment.

FIGS. 7–14 show a series of diagrams illustrating a USBF technique according to an aspect of the invention. In FIG. 7, a first fiber 130 and a bridge fiber 132 are prepared for splicing. These preparations include stripping and cleaving an end of each fiber 130 and 132 to provide suitable splicing surfaces. In FIG. 8, a fusion splicing technique has been used to splice together the first fiber 130 and the bridge fiber 132 at a splice point 134. It will be appreciated that, in FIGS. 7–14, either of the first fiber 130 or the second fiber 138 may be the fiber with the larger diameter modefield or the narrower diameter modefield, without departing from the spirit of the present invention.

Figure 10:
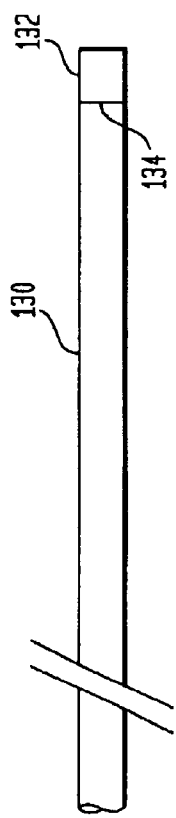

In FIG. 9, the bridge fiber 132 is cleaved at a point 136 that is a predetermined distance away from the splice point 134. As mentioned above, it has been determined that a suitable distance between the splice point 134 and the cleave point 136 is approximately 1 millimeter. FIG. 10 shows a diagram of the first fiber 130 and USBF 132 after the bridge fiber 132 has been cleaved.

It should be noted that because the bridge fiber 132 is cleaved to such a short length, the second end of the bridge fiber 132 is already stripped. Thus, the use of an ultra-short bridge fiber saves some time at this point in the splicing process.

Figure 11:
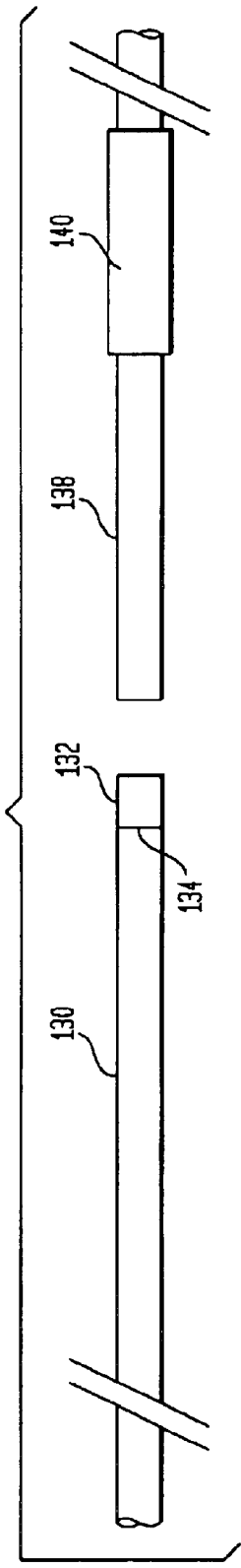

In FIG. 11, a second fiber 138 is prepared for splicing by stripping and cleaving a lead end of the fiber 138. As shown in FIG. 11, a tubular protective splint 140 has been slid over the second fiber 138. It would also be possible to slide the splint 140 over the first fiber 130 and bridge fiber 132. It would also be possible to use another type of splint 140 without departing from the spirit of the invention. The splint 140 is fabricated from a heat-shrinkable material. Prior to being heat-shrunk, the splint 140 has an inner diameter that is large enough to allow it to be easily slid over the fibers to be spliced.

Figure 12:
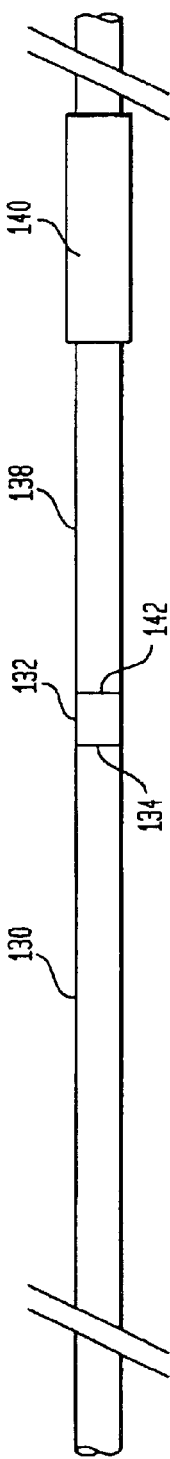
Figure 13:
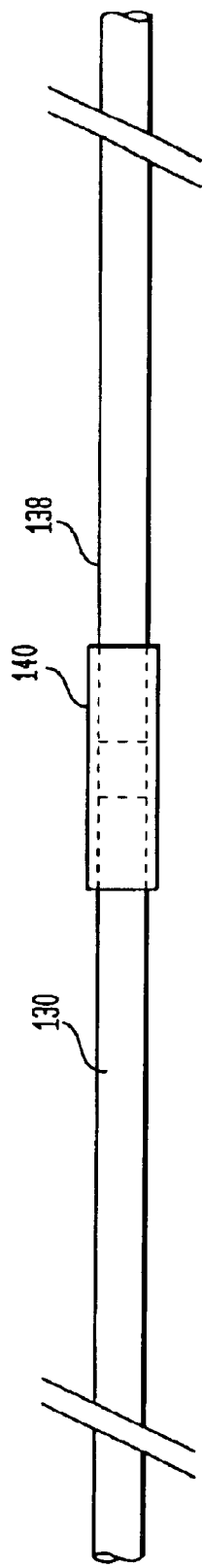
Figure 14:
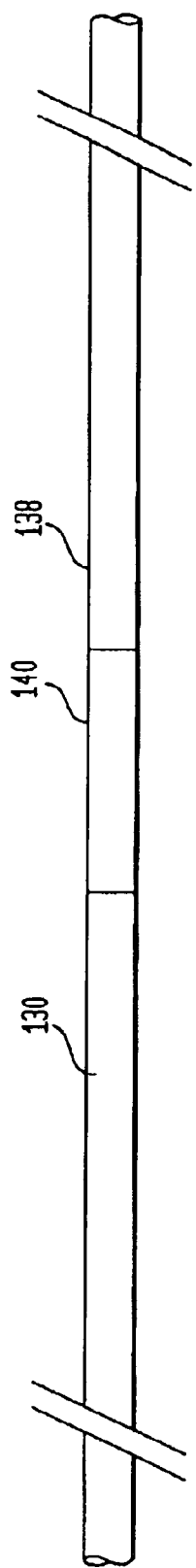

In FIG. 12, the lead end of the second fiber 138 is spliced to the second end of the bridge fiber 132 at a second splice point 142. In FIG. 13, the protective splint has been slid into position over the two splice points 132 and 142 and USBF 132. In FIG. 14, heat from a suitable source, such as a hot air nozzle, has been applied to the protective splint, causing it to shrink around the two splice points 132 and 142 and USBF 132.

Figure 15:
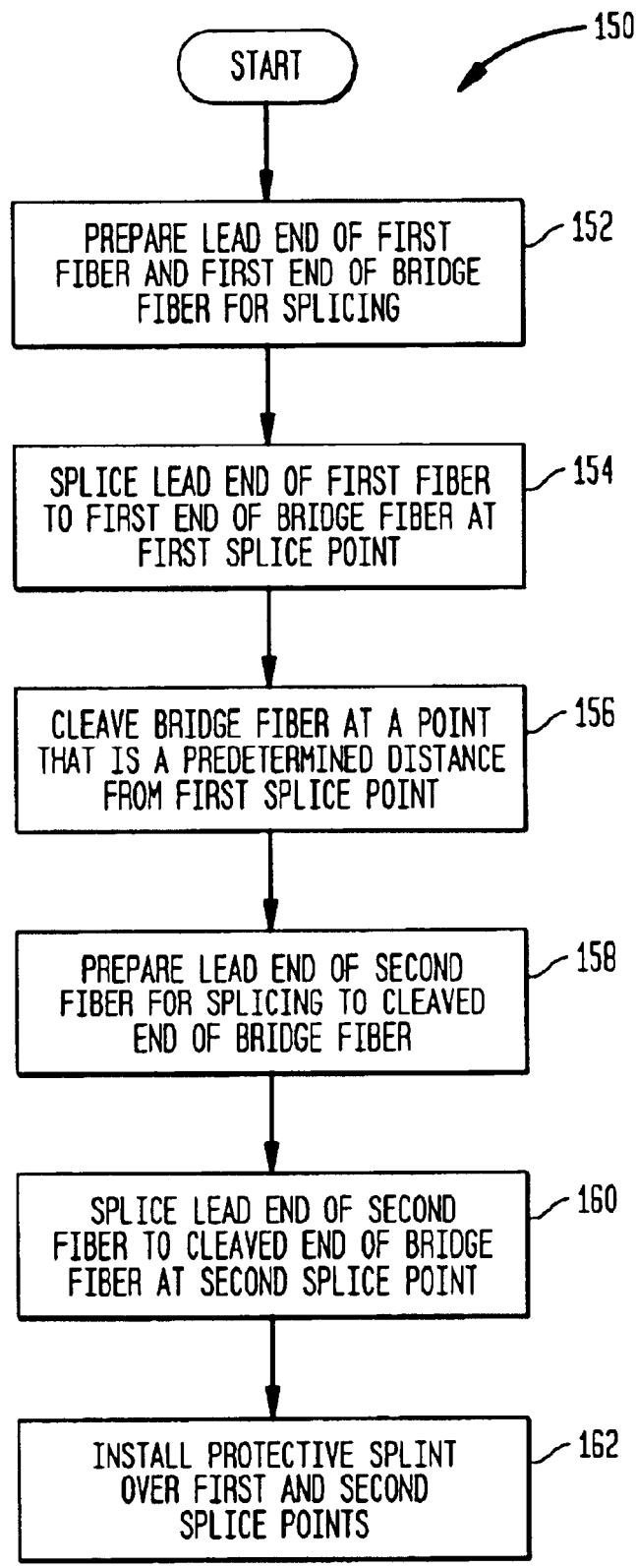
FIG. 15 shows a flowchart of a method according to a further aspect of the invention for constructing an optical fiber transmission line having an ultra-short bridge fiber.

FIG. 15 shows a flowchart of a method 150 according to an aspect of the invention. In step 152, the lead end of a first fiber and a first end of a bridge fiber are prepared for splicing. As discussed above, this preparation includes stripping and cleaving the fiber ends. As further discussed above, the first fiber may be either the fiber with the larger modefield diameter or the narrower modefield diameter.

In step 154, a suitable splicing technique, such as a fusion splicing technique, is used to splice the lead end of the first fiber and the first end of the bridge fiber at a first splice point. In step 156, the bridge fiber is cleaved at a point that is a predetermined distance away from the first splice point. As discussed above, a suitable predetermined distance is approximately 1 mm. In step 158, the lead end of a second fiber is prepared for splicing to the cleaved end of the bridge fiber. As discussed above, the preparation of the lead end of the second fiber includes stripping and cleaving the second fiber. In addition, a heat-shrinkable protective splint may be slid over either the second fiber end, or over the cleaved bridge fiber and first fiber.

In step 160, the lead end of the second fiber is spliced to the cleaved end of the bridge fiber at a second splice point. In step 162, a protective splint is installed over the first and second splice points. As described above, if a heat-shrinkable splint is used, it is installed by sliding it into a position where it covers the first and second splice points, and then heating the splint to cause it to shrink so that it fits snugly over the first and second splice points.

As mentioned above, it has been found that, in addition to providing for more efficient packing of spliced fibers, the use of a USBF results in a significant decrease in splice loss compared with the splice loss obtained using a 2-meter bridge fiber.

FIG. 16 shows a graph 170 comparing measured splice loss for first and second sample optical fiber transmission lines. Each of the two sample transmission lines was constructed using OFS Fitel Super Large Area (SLA) fiber, OFS Fitel True Wave fiber for the bridge fiber, and OFS Fitel Inverse Dispersion Fiber (IDF) for the second fiber. IDF is commercially available having a number of different slopes.

The IDF that was used in the present example has a negative slope that is twice as steep as the slope of the SLA fiber, and is therefore referred to as IDFx2. An Alcoa-Fujikura GSM-40S field splicer was used to perform the splice. A PS-02 field stripper was used, and a CT-03 field cleaver was used.

SLA fiber has a modefield diameter of approximately 12 microns. IDFx2 fiber has as modefield diameter of approximately 6 microns. True Wave fiber has a modefield diameter of approximately 9 microns.

Each sample transmission line was constructed first with a 2-meter bridge fiber. Splice loss was then measured using a GN Model 8000 to perform optical time domain reflectometer (OTDR) measurements and a PK Model 220 to perform spectrum-attenuation measurements. The OTDR measurements were conducted at 1550 nm and 1625 nm. The spectrum-attenuation measurements were performed from 1500 nm to 1650 nm, using steps of 5 nm.

After testing, the bridge fiber of each sample transmission line was cleaved proximate to a splice point to produce an ultra-short bridge fiber. The remainder of the bridge fiber was then cut away, and the fibers were re-spliced together. Each sample transmission line was then tested a second time for splice loss, using OTDR conducted at 1550 nm and 1625 and spectrum-attenuation measurements performed from 1500 nm to 1650 nm, using steps of 5 nm.

In FIG. 16, the hollow diamonds 172 represent OTDR measurements, at 1550 nm and 1625 nm, for Sample No. 1 having a 2-meter bridge fiber. The hollow triangles 174 represent corresponding OTDR measurements for Sample No. 1 having a USBF. The solid diamonds 176 represent spectrum-attenuation measurements, from 1500 nm to 1650 nm, for Sample No. 1 having a 2-meter bridge fiber. The solid triangles 178 represent corresponding spectrum-attenuation measurements for Sample No. 1 having a USBF.

Further, in FIG. 16, the hollow squares 180 represent OTDR measurements, at 1550 nm and 1625 nm, for Sample No. 2 having a 2-meter bridge fiber. The hollow circles 182 represent corresponding OTDR measurements for Sample No. 2 having a USBF. The solid squares 184 represent spectrum-attenuation measurements, from 1500 nm to 1650 nm, for Sample No. 2 having a 2-meter bridge fiber. The solid circles 186 represent corresponding spectrum-attenuation measurements for Sample No. 2 having a USBF. As shown in FIG. 16, the use of a USBF results in a reduction of splice loss compared with using a 2-meter bridge fiber.

FIG. 17 shows a pair of tables 200 and 220 comparing measured splice loss in a number of trials, in which production parameters were varied. The upper table 200 shows measured splice loss in a sample transmission line having a USBF, and the lower table 220 shows measured splice loss in a sample transmission line in which the larger modefield diameter fiber was spliced directly to the narrower diameter modefield fiber. The larger modefield diameter fiber was a type DP super larger area (SLA) fiber, and the USBF was a type DL bridge fiber. The narrower modefield diameter fiber was, in some cases, a type DV inverse dispersion fiber (IDFx2). In other cases, a type DW IDFx2 was used.

As set forth in the tables 200 and 220, the parameters included splicer manufacturer, splicer model, splicer use, and fiber type. The tables set forth the best measured splice loss at 1550 nm. Other variations in production parameters and techniques are set forth in the "Comment" column.

From the tables 200 and 220 shown in FIG. 17, it will be seen that in many cases the use of a USBF can produce a significant reduction in splice loss compared with splicing the first fiber directly to the second fiber. Further, it was found that the a USBF could be fabricated in approximately seven minutes, including performing both splices.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method for fabricating an optical fiber transmission line from a first fiber and a second fiber having different modefield diameters, comprising:
   (a) stripping a first end of a bridge fiber having an intermediate modefield diameter between the modefield diameters of the first and second fibers and splicing the first end of the bridge fiber to a lead end of the first fiber;
   (b) cleaving the bridge fiber through its stripped first end proximate to the splice between the first fiber and the bridge fiber to leave an ultrashort length of stripped bridge fiber spliced to the first fiber;
   (c) splicing a lead end of the second fiber to the cleaved end of the ultrashort length of bridge fiber; and
   (d) mounting a single protective splint over both splice points.

2. The method of claim 1, further including the following step performed after mounting the protective splint over both splice points:
   (e) packaging the bridge fiber, including both splice points and the protective splint, inside a splice case.

3. The method of claim 1, further including the following step performed prior to splicing the lead end of the first fiber to a first end of the bridge fiber:
   preparing the lead end of the first fiber for splicing.

4. The method of claim 3, wherein the step of preparing the lead end of the first fiber for splicing includes stripping and cleaving the lead end of the first fiber.

5. The method of claim 1, further including the following step performed prior to splicing the lead end of the second fiber to a second end of the bridge fiber:
   preparing the lead end of the second fiber for splicing.

6. The method of claim 5, wherein the step of preparing the lead end of the second end of the second fiber for splicing includes stripping and cleaving the lead end of the second fiber.

7. The method of claim 1, further including sliding a single heat-shrinkable protective splint over the bridge fiber and the first and second splice points and then applying heat to the splint to cause it to shrink around the bridge fiber and the first and second splice points.

8. The method of claim 1, wherein the first fiber is a super large area fiber and the second fiber is an inverse dispersion fiber.

9. The method of claim 8, wherein the bridge fiber is a true wave fiber.

10. The method of claim 1, wherein the ultrashort bridge fiber has a length of approximately 1 millimeter.

* * * * *